Feb. 24, 1942.　　　　C. S. ASH　　　　2,274,353
DUAL WHEEL ASSEMBLY
Filed May 20, 1939　　　3 Sheets-Sheet 3

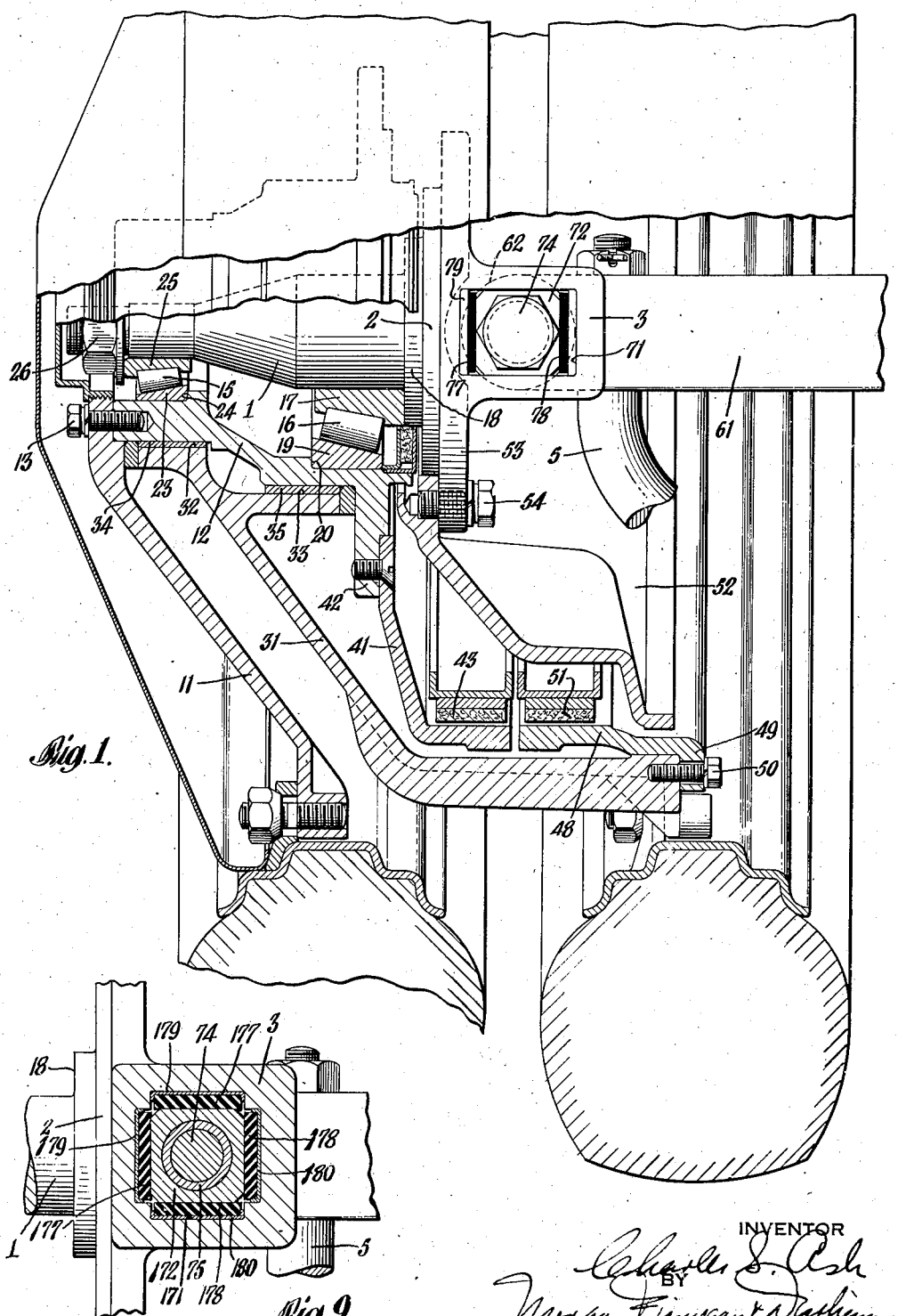

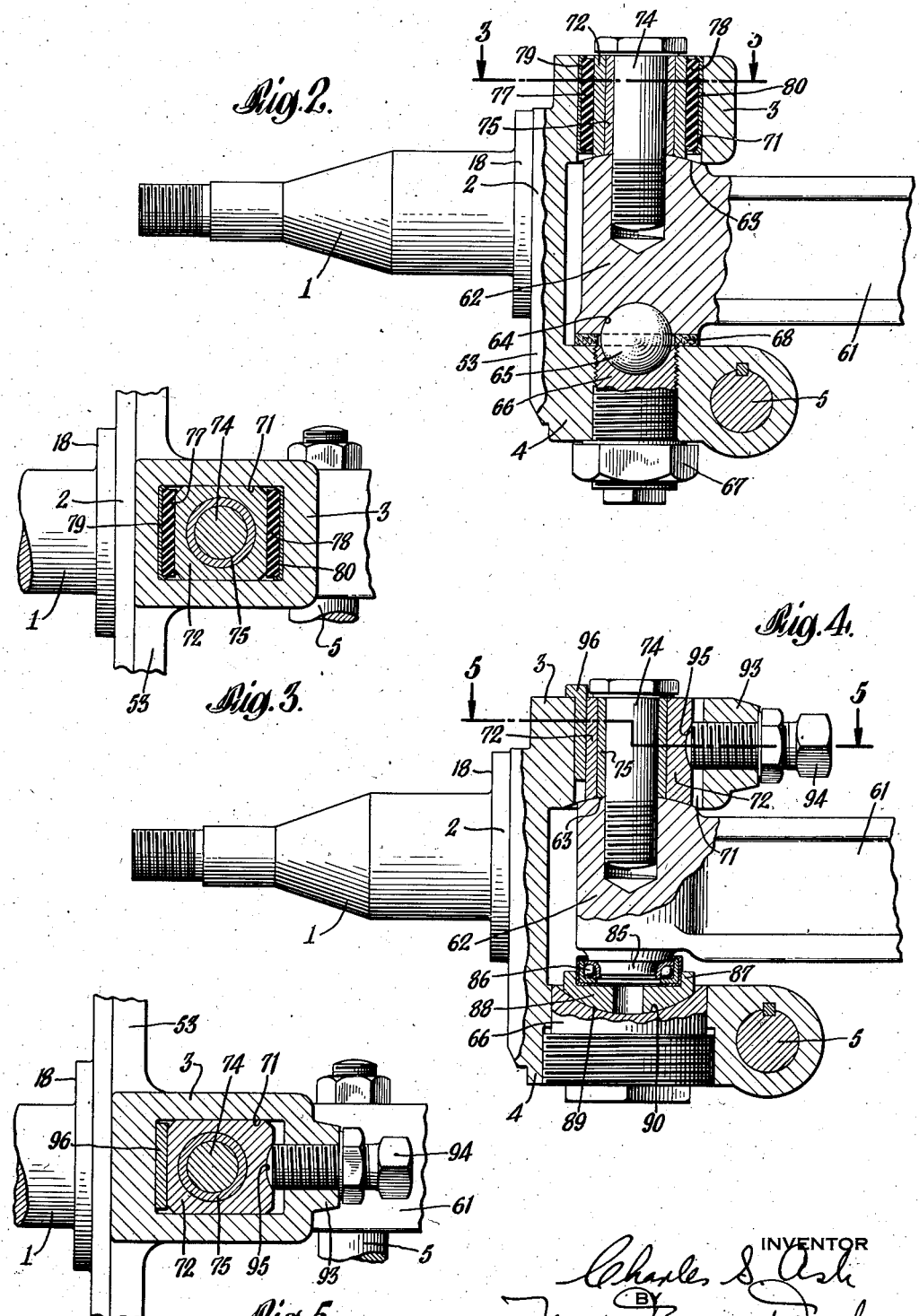

INVENTOR
Charles S. Ash
BY
Morgan Finnegan Durham
ATTORNEYS

Patented Feb. 24, 1942

2,274,353

UNITED STATES PATENT OFFICE 2,274,353

DUAL WHEEL ASSEMBLY

Charles S. Ash, Milford, Mich.

Application May 20, 1939, Serial No. 274,669

6 Claims. (Cl. 280—96.1)

The invention relates to new and useful improvements in dirigible differential wheel assemblies, and more particularly to such improvements in dirigible differential wheel assemblies whereby camber is imparted or permitted to the wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a partial horizontal plan and section through a left-hand dual wheel assembly embodying the invention;

Fig. 2 is an enlarged fragmentary detail elevation, with parts in section of the steering knuckle and wheel spindle and end of the axle beam of Fig. 1;

Fig. 3 is a section on line 3—3 of Fig. 2;

Fig. 4 is a view similar to Fig. 2 but showing a somewhat different form of mechanism;

Fig. 5 is a section on line 5—5 of Fig. 4;

Fig. 9 is a section similar to Fig. 7 but showing a modification.

Figure 6:
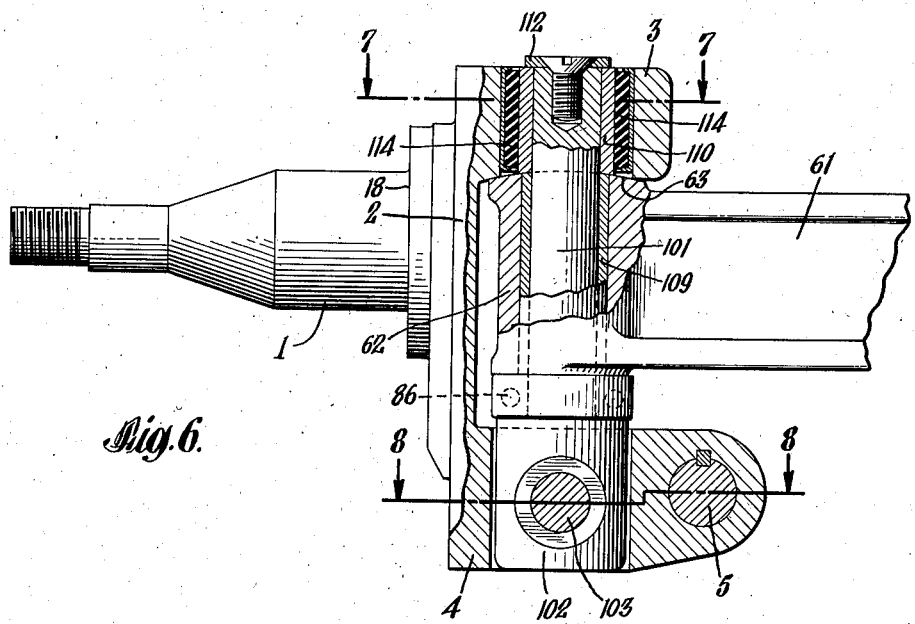
Fig. 6 is a view similar to Fig 2 but showing another different form of the mechanism.

Objects of the invention are to provide for or effect a limited or desired amount of camber in dirigible differential front wheel assemblies; to provide means for effecting the camber either automatically or settably to a desired or predetermined degree; to provide camber permitting or camber effecting mechanism in connection with the king pin mounting of the steering knuckle on the axle beam; to provide for automatically effecting camber to conform to variations in the road bed so as to impose equal load and wear on both wheels; to provide for automatic variation in the caster so that a different caster will be had for forward motion and for reverse motion, and the reverse steering thereby be rendered more stable.

To these ends there is provided, as a present preferred embodiment, dirigible differential front wheels, freely relatively rotatable on an integral spindle and yoked steering knuckle which have rotative movement relatively to the end of the front axle bar about an interposed king pin, which may be mechanical or geometrical, the knuckle and spindle being angularly movable about the king pin axis by the steering gear. To effect desired camber, whether automatic or settable camber is desired, the king pin is mounted to have limited vertical angular movement relatively to the axle bar, about a substantially supporting point or horizontal axis, which may be either a pivotal or spherical support for the king pin. This relative movement of the king pin in a vertical plane may be in a fixed plane or in planes varying with the steering movements of the knuckle. With the automatically settable camber, the king pin is resiliently held to a normal position about said axis, but has limited angular movement from that position, and if desired, in a plurality of directions, and by the cambering action thus obtained the side-by-side tires are allowed to conform to the road bed and thereby uniform action is obtained as to loading wear, traction, steering, while the wheels are freely rotatable with respect to each other; and where a settable camber is desired, means are provided for setting the king pin in a desired predetermined angular position and maintaining it in that position until a change in the camber setting is desired.

Referring now to the embodiment of the invention illustrated by way of example in the accompanying drawings, a wheel spindle I has integral therewith a yoked knuckle having a body portion 2 and horizontally-extending arms 3 and 4, there being a connection 5 between the lower arm and the steering mechanism which may be of usual form.

The embodied form of side-by-side differential wheels rotatably mounted on the spindle I comprises an outboard wheel having a dished web II fastened to the flat outer face of a hub 12 by screw bolts 13, the hub 12 encircling the spindle I. Between the hub 12 and the spindle I are two spaced apart inclined roller bearings 15 and 16, which may be of suitable or known form. The inner ring 17 of inner bearing 16 abuts on its inner face on a flange or shoulder 18 integral with spindle I and the outer face of the outer ring 19 abuts on a shoulder 20 formed in hub 12. The outer ring 23 of outer bearing 15 abuts at its inner face on a shoulder 24 on hub 12, and outer face of inner ring 25 of this bearing abuts on a nut 26 screw-threaded on the end of spindle 1. The inboard wheel comprises a dished web 31 integral with which is a dished offset hub, having two cylindrical bearing surfaces 32 and 33, which are journaled on corresponding cylindrical surfaces on the exterior of hub 12 with suitable interposed bushings 34 and 35. Braking means are provided for each wheel, the outboard wheel having a brake drum 41 which is bolted to a flange 42, integral with and extending outwardly from the inner end of the inner wheel hub 12, and an expansible brake shoe 43 is mounted within the drum 41 and is provided with suitable actuating means. The inboard wheel has a brake drum 48 having an integral, outwardly-extending annular lip 49 abutting on the inner flat annular face of wheel 31 and fastened thereto by screw bolts 50. Drum 48 likewise has an expansible brake shoe 51 operated by suitable means. A dished protecting shield 52 for the brake mechanism is provided, which is centrally internally apertured, and adjacent to said aperture is fastened to and supported from a disc 53 integral with wheel spindle 1 by screw bolts 54.

In the embodied form of camber-effecting means a universal joint is provided between the steering knuckle and axle beam end for effecting relative rotary movement between them, whereby automatic cambering may be effected concurrently with the usual steering control. As embodied, and referring particularly to Figs. 1, 2 and 3, an axle beam 61 has an enlarged end 62, fitting within the spaced-apart arms 3 and 4 of the steering knuckle, the end 62 having a convex spherical top bearing surface 63 and a bottom concave spherical bearing surface 64. The bearing surface 64 rests upon a ball 65 which is supported in a concave spherical seat in the inner end of a screw-threaded plug 66, screw-threaded into the arm 4 of the knuckle and held in place by a nut 67. Thus these spherical bearing surfaces between the knuckle and axle beam serve as a pivotal or universal bearing between them, relative rotary movement about a substantially vertical axis permitting steering and relative rotary movement about a substantially horizontal axis effecting automatic or settable camber. A resilient washer 68 is interposed between the bottom of the axle bar end 62 and the top surface of the yoke arm 4, a central aperture therein encircling the ball 65. In the upper arm 3 of the steering knuckle is an elongated, preferably rectangular, aperture 71, within which is slidably fitted a block 72, the block being shorter than the aperture to have slidable play longitudinally. A king pin 74 is screw-threaded into the upper face of the head 62 of the axle bar and extends upwardly through an internal cylindrical opening in the block 72, a bushing 75 being interposed between the pin and block. The lower face of the block 72 is concavely spherical and rests upon the convex spherical surface 63 of the head 62. In rectangular opening 71, in the space at either end of block 72 are resilient pads 77 and 78, held in place by metal casings 79 and 80, the pads acting as resilient stops to limit the movement of block 72 at the ends of its path. With this construction, as the wheels pass over the road surface, wheel spindle 1 has angular vertical play to a limited extent, the steering knuckle rotating on its universal bearing and about the center of ball 65, the spindle and knuckle having relative movement with respect to the king pin about the center of the ball as a geometrical pivot point. In such movements, arm 3 has relative movement with respect to the block 72 and pin 74, this movement being limited by the compression of the pads 77 or 78, to automatically effect a degree of camber, and through this cambering action the side-by-side tires are allowed to more or less conform to the road surface. This structure will also allow for substantially equal loading of the tires when the wheels are steered about an inclined king pin.

Means are also provided by the invention for imposing and maintaining a fixed predetermined amount of camber, and as here embodied, referring especially to Figs. 4 and 5, axle head 62 has a conoidal bottom portion 85 resting on a thrust ball bearing 86 which is supported in a circular recessed portion 87, formed in the top face of a self-alining block 88, having a convex spherical bottom face 89 resting on a corresponding concave spherical face 90 formed in the inner face of screw plug 66, which is screw-threaded into arm 4 of the steering knuckle. On the exterior end of arm 3 of the knuckle is a boss 93, into which is threaded a screw-bolt 94, the inner end of which engages a depressed seat 95 in the side of block 72. Within aperture 71, at the outer end thereof opposite the screw-bolt 94, is an insertable and removable shim 96, which is held in position by a laterally-extending lip along the top edge which overlies the top of yoke 3. By using shims of different thicknesses, and by turning the screw bolt 94 to press the block 72 firmly against the shim, various desired degrees of camber may be imparted to the spindle, the knuckle having slight movement on the spherical surfaces 63 and 90, the thrust bearing participating in the relative movement of the steering knuckle and axle bar during the steering movement.

Figure 8:
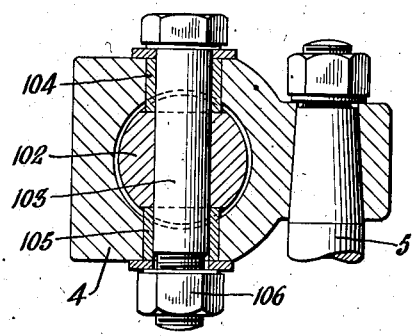
Fig. 8 is a section on line 8—8 of Fig. 6.
Figure 7:
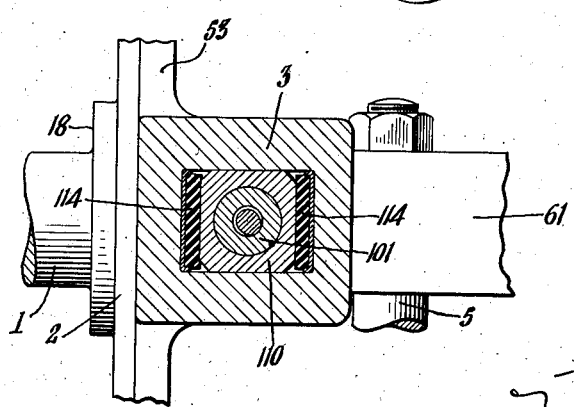
Fig. 7 is a section on line 7—7 of Fig. 6.

In Figs. 6, 7 and 8 is shown another form of the automatic camber-effecting mechanism wherein a king pin 101 has an enlarged flat-sided base 102. The base 102 is located within a cylindrical opening in lower arm 4 of the steering knuckle, with considerable side play. The base 102 is pivotally supported on a bolt 103, which projects through flanged bushings 104 and 105, seated in openings formed at either side in the knuckle arm 4, the bolt being held in place by a nut 106. Pin 101 extends upwardly through a cylindrical opening in axle beam head 62, with an interposed bushing 109; the pin 101 also projecting farther through a block 110. This block is mounted within an opening in the arm 3 of the steering knuckle, with considerable play longitudinally of the axle and spindle. A retaining plate 112 is screw fastened to the head of the king pin. Block 110 has a concavely spherical bottom which rests on the convex spherical top 63 of the axle beam head, block 110 thus having considerable sliding movement on its support 63 to effect required cambering. Compression pads 114 are provided at either side of the block 110 to resiliently limit its sliding movement similar to pad 77 of the previously described form. Ball bearings 86 are provided at the bottom of the cylindrical opening 62, the construction thereof being in general similar to that shown and described in connection with Fig. 4.

In Fig. 9 a modified form is shown which permits both variable cambering and castering action as required. The general structure of the king-pin joint is the same as, or similar to, that shown in Fig. 2, but the mounting of the king pin in the upper yoke arm 3 is changed to permit variable cambering and castering action of the wheels. To this end, block 172 has all around, resilient floating fit in the opening 171, the vertical edges of the block 172 being beveled to afford considerable play and also to allow for universal movement of the block relatively to the opening. Resilient means are provided on all four sides to limit the movement of block 172, and for this purpose the opening 171 has on all four sides a recess in each of which is seated a casing 180, each holding a resilient pad 177 or 178, any one or two of which, acting concurrently, will permit and also limit the lateral movement of the block and consequently the cambering and castering actions. The universal movement of the block 172 provides both cambering and castering movement, the camber of the wheel spindle being proportional to the resultant of the movement of the king pin in the direction of the wheel spindle, and the transverse resultant movement of the king pin provides automatic variation in the caster so that a different caster will be had for forward movement and reverse movement of the vehicle and the reverse steering thereby be rendered more stable.

It will be understood that my adjustable king pin structure which provides automatic camber or for setting a predetermined fixed camber, can be adapted to all types of front axle beam and knuckle structures. The pivoting point can be arranged at the bottom portion of the knuckle as shown herein or can be reversed and located at the top portion of the knuckle; and by raising or lowering the pivoting point for the camber action the amount of compensation for the two tires at the road bed is affected.

The invention in its broader aspects is not limited to the specific mechanisms shown and described but departures may be made therefrom within the scope of the accompanying claims without departing from the principles of the invention and without sacrificing its chief advantages.

What I claim is:

1. A dual dirigible front wheel assembly including in combination a wheel spindle and yoked steering knuckle, dual wheels mounted on said spindle, an axle beam with its end within said yoke, a king pin mounted in said axle beam end and forming a substantially vertical axis for the yoke, a spherical supporting seat in the lower arm of said yoke coaxial with the king pin, a block in which the king pin is mounted, said block being slidably mounted in an elongated opening in the upper arm of said yoke, and resilient means within the ends of said elongated opening and resiliently yieldable under pressure from said slidable block.

2. A dual dirigible front wheel assembly including in combination a wheel spindle and yoked steering knuckle, dual wheels mounted on said spindle, an axle beam with its end within said yoke, a spherical bearing between said beam and the upper arm of said yoke, a king pin mounted in said axle beam end, and forming a substantially vertical axis for the yoke, a spherical supporting seat coaxial with the king pin in the lower arm of said yoke, a block in which the king pin is mounted, said block being slidably mounted in an elongated opening in the upper arm of said yoke, and resilient means within the ends of said elongated opening and resiliently yieldable under pressure from said slidable block.

3. A dual dirigible front wheel assembly including in combination a wheel spindle and yoked steering knuckle, dual wheels mounted on said spindle, an axle beam with its end within said yoke, a king pin mounted in said axle beam end and forming a substantially vertical axis for the yoke, a spherical supporting seat coaxial with the king pin in the lower arm of said yoke, a block in which the king pin is mounted, said block being slidably mounted in an elongated opening in the upper arm of said yoke, and means mounted on said upper yoke arm cooperating with said slidable block to govern the position of the block in said opening.

4. A dual dirigible front wheel assembly including in combination a wheel spindle and yoked steering knuckle, an axle beam with its end within said steering knuckle yoke, a king pin fixed to the axle beam and forming a substantially vertical axis for the yoke, means interconnecting the king pin and steering knuckle yoke, and arcuate bearing surfaces between the upper arm of the yoke and the axle beam and between the lower arm of the yoke and the axle beam for permitting pivotal movement of the spindle and wheels about a substantially horizontal axis.

5. A dual dirigible front wheel assembly including in combination a wheel spindle and yoked steering knuckle, an axle beam with its end within said steering knuckle yoke, a king pin fixed to the axle beam and forming a substantially vertical axis for the yoke, means interconnecting the king pin and steering knuckle yoke, and arcuate bearing surfaces between the upper arm of the yoke and the axle beam and between the lower arm of the yoke and the axle beam for permitting pivotal movement of the spindle and wheels about a substantially horizontal axis which intersects that of the king pin.

6. A dual dirigible front wheel assembly including in combination a wheel spindle and yoked steering knuckle, a pair of wheels on the spindle, an axle beam with its end within said steering knuckle yoke, a king pin fixed to the axle beam between the two wheels and forming a substantially vertical axis for the yoke, means interconnecting the king pin and steering knuckle yoke, and arcuate bearing surfaces between the upper arm of the yoke and the axle beam and between the lower arm of the yoke and the axle beam for permitting pivotal movement of the spindle and wheels about a substantially horizontal axis.

CHARLES S. ASH.